United States Patent
Benkreira et al.

(10) Patent No.: US 10,956,837 B1
(45) Date of Patent: Mar. 23, 2021

(54) DETECTING OVERBOOKED FLIGHTS AND WARNING PASSENGERS, AND APPLICATIONS THEREOF

(71) Applicant: Capital One Services, LLC, McLean, VA (US)

(72) Inventors: Abdelkader M'Hamed Benkreira, New York, NY (US); Joshua Edwards, Philadelphia, PA (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/694,154

(22) Filed: Nov. 25, 2019

(51) Int. Cl.
*G06Q 10/02* (2012.01)
*G06N 20/00* (2019.01)
*G06Q 50/30* (2012.01)

(52) U.S. Cl.
CPC ............. *G06Q 10/02* (2013.01); *G06N 20/00* (2019.01); *G06Q 50/30* (2013.01)

(58) Field of Classification Search
CPC .................................. G06Q 10/02; G06Q 50/14
See application file for complete search history.

(56) References Cited

U.S. PATENT DOCUMENTS

| | | | |
|---|---|---|---|
| 7,472,080 B2 | 12/2008 | Goel | |
| 8,600,787 B2 | 12/2013 | Fox et al. | |
| 10,102,487 B2 | 10/2018 | Jacobs et al. | |
| 2007/0100962 A1 | 5/2007 | Barth et al. | |
| 2010/0036688 A1* | 2/2010 | Sethna | G06Q 10/02 705/5 |
| 2010/0070314 A1* | 3/2010 | Jethani | G06Q 10/02 705/6 |
| 2011/0137692 A1* | 6/2011 | Sethna | G06Q 10/02 705/5 |
| 2013/0132128 A1* | 5/2013 | Fox | G06Q 10/0631 705/5 |
| 2014/0278596 A1* | 9/2014 | Cordero | G06Q 10/02 705/5 |
| 2016/0125327 A1* | 5/2016 | Lamoureux | G06Q 10/025 705/6 |
| 2017/0148030 A1* | 5/2017 | Fernandez Acuna | G06Q 30/016 |
| 2018/0276578 A1 | 9/2018 | Otillar | |
| 2019/0303803 A1* | 10/2019 | Buc | G06Q 20/36 |

FOREIGN PATENT DOCUMENTS

CN        108985911 A   *  12/2018

OTHER PUBLICATIONS

Translated CN108985911A (Year: 2018).*
Potter, Airlines are Turning to Apps to Get Volunteers for Oversold Flights, thriftytraveler.com, May 6, 2019 (Year: 2019).*
Zenkert, No-show Forecast Using Passenger Booking Data, Lund University Centre for Mathematical Sciences, Feb, 24, 2017.*

* cited by examiner

*Primary Examiner* — Daniel Vetter (74) *Attorney, Agent, or Firm* — Sterne, Kessler, Goldstein & Fox P.L.L.C.

(57) ABSTRACT

Described herein is a method, system, and non-transitory computer readable medium for monitoring transaction data for a user in a proactive and reactive mode for a detecting of a booking of a flight by the user in the transaction data, parsing flight detail parameters of the booking, and inputting parameters into a prediction model, such that if the likelihood of the flight being oversold exceeds a certain threshold, the user may be notified that the flight may be oversold.

17 Claims, 6 Drawing Sheets

DETECTING OVERBOOKED FLIGHTS AND WARNING PASSENGERS, AND APPLICATIONS THEREOF

BACKGROUND

When seeking to purchase flights, customers often desire a comfortable booking and optimal flying experience. However, airlines have an incentive to sell as many seats as possible. Because customers sometimes do not show up for flights, inclement weather, late arrivals, and other sources of passenger attrition, airlines are able to oversell their flights to an extent to account for these "no-shows." Overselling seats in this manner may be in the airline's best interest due to reasons such as loss-minimization in case of such attrition.

When a plane is oversold and too many passengers show up, there may not be enough seats to assign to present passengers. In this case, airlines may ask volunteers to give up their seats in exchange for incentives, to arrange seats for the remaining passengers. If volunteers are asked to give up their seats and fly on a different flight and there are not enough volunteers to do so, airlines sometimes involuntarily bump passengers from an oversold flight, in a practice known as "bumping." Thus a customer in such a situation, where the airline has oversold their flight, may be at risk of losing his or her seat on the plane with no advance notice. This is a very disadvantageous circumstance, as a customer may want to get to his or her destination at any cost where e.g., the flight may be an important family event or emergency. Other cases in which such a circumstance could cause trouble for the customer even for a normal flight (no important event, emergency, etc.) is where the customer may have anxiety, stress, or medical-related issues in finding out a change in seat status with minimal advance notice before the departure of a flight, etc. In all of these important cases, among others, customers may want to know beforehand if they risk such an overselling situation.

On the other hand, certain customers looking for discounts may be actively seeking to put themselves in such a situation where airlines may be prone to overselling their seats. In such cases, if the airline offers incentives such as a reduced rate ticket, free ticket, vouchers, etc. to passengers in exchange for volunteering to fly on a different flight, these customers may not care so much about a delay in arrival to their destination, and thus may be agreeable to changing their flight schedule, and in addition may be able to take advantage of these offers and discounts that are received as an incentive from airlines for making such changes. In this case as well, customers may want to know beforehand when they can put themselves in an overselling situation, such that they may be able to increase their chances of availing of such benefits in exchange for changing their flight.

BRIEF DESCRIPTION OF THE DRAWINGS/FIGURES

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

The drawing in which an element first appears is typically indicated by the leftmost digit or digits in the corresponding reference number. In the drawings, like reference numbers may indicate identical or functionally similar elements.

DETAILED DESCRIPTION

Provided herein are system, apparatus, device, method and/or computer program product embodiments, and/or combinations and sub-combinations thereof, for the prediction of a flight being oversold, by a central module, and the consequent conveying of the prediction information to the source module.

Regardless of whether a customer would like to avoid a situation where it is likely that tickets will be oversold for a flight, or whether conversely a customer would like to actively enter a situation where it is likely that tickets will be oversold for a flight, there is a need for the customer to be aware of an overselling situation. Where the customer is aware that the purchase of a flight has or might put them in an overselling situation, they can accordingly take action to enter or withdraw from such a situation, which would ultimately make for a smoother and more comfortable transactional experience, and a more comfortable flight.

The embodiments described herein utilize a combination of data to accurately predict situations where there may be a high chance that an airline will oversell tickets for a particular flight. In an embodiment, the prediction may take place after a customer is transacting to purchase a flight ticket. Alternatively, the prediction may take place while the customer is transacting to purchase the flight ticket. Utilizing the prediction data, the described embodiments are able to notify a user in a proactive, or alternately a reactive manner, so that the customer is made aware of this information timely and can act on it, to ensure a transactional and flight experience in line with their wishes.

Figure 1:
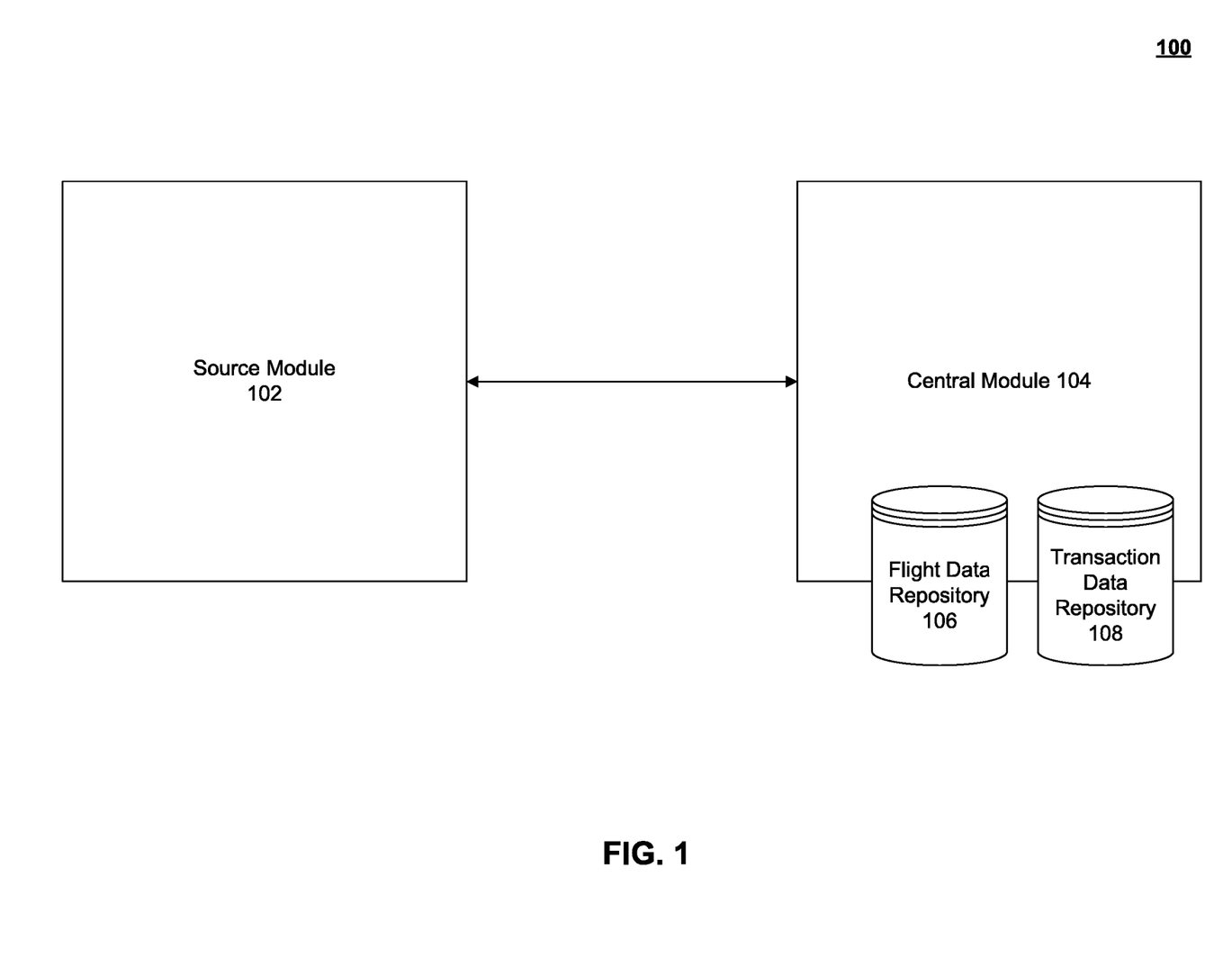
FIG. 1 is a block diagram of an example embodiment where a central module is accessed by a source module for prediction processing.
Figure 2:
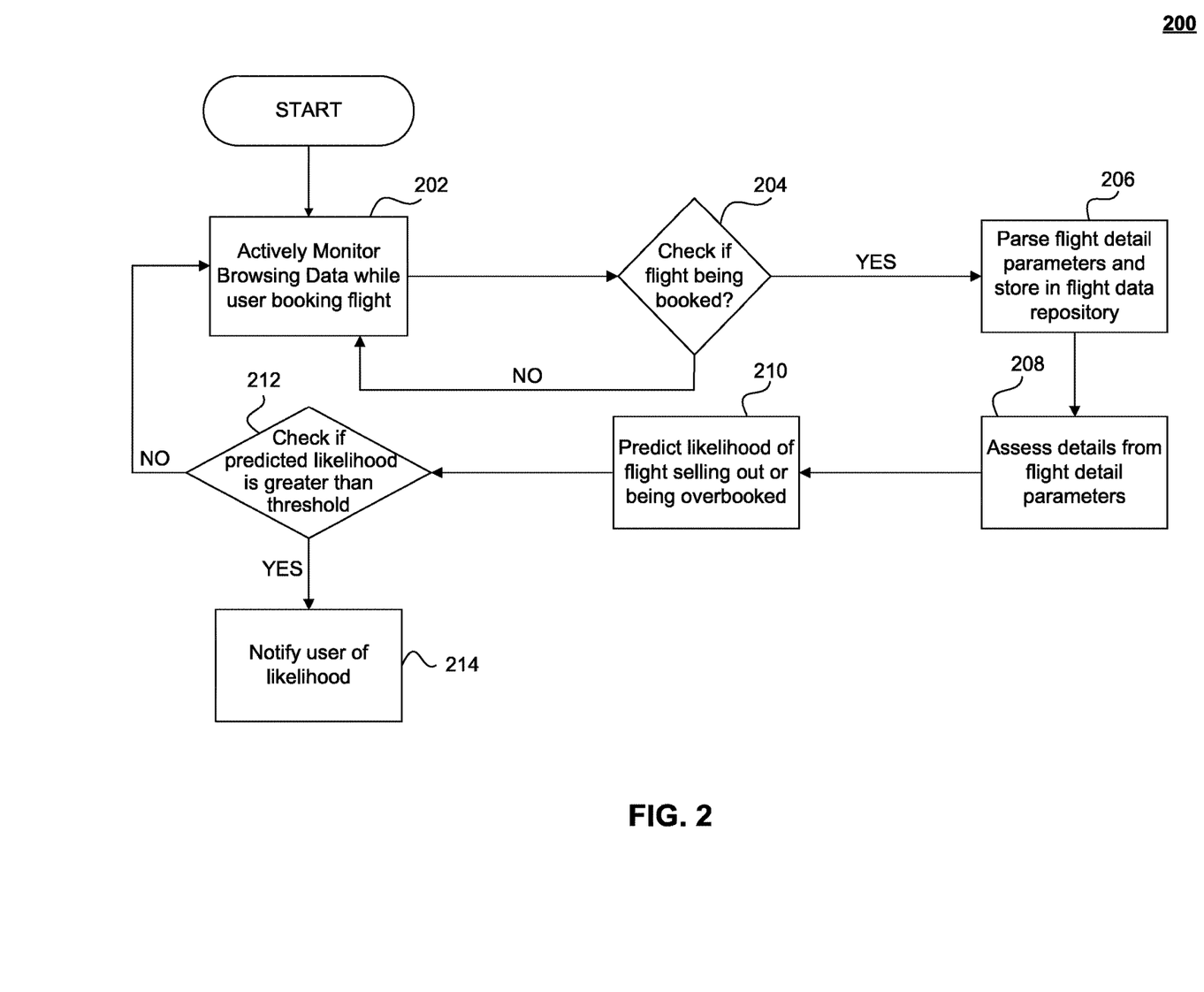
FIG. 2 is a flowchart illustrating a proactive prediction mode, according to an embodiment.
Figure 3:
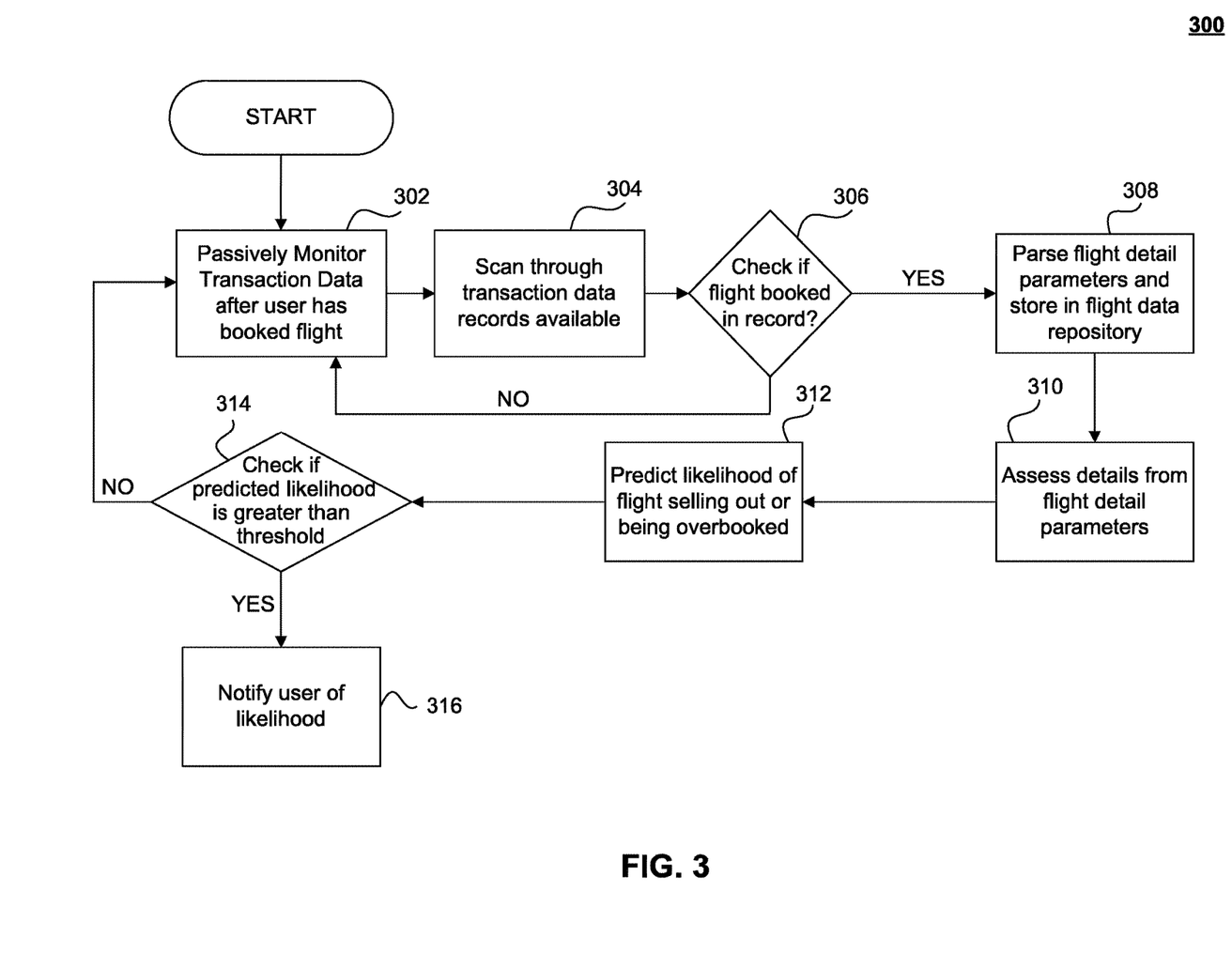
FIG. 3 is a flowchart illustrating a passive and reactive prediction mode, according to an embodiment.

FIGS. 2 and 3 illustrate different embodiments of prediction processing modes in the instant disclosure, including a proactive prediction mode, and a reactive prediction mode, respectively. FIG. 1 is a block diagram of a data-transfer environment 100 showing the interaction between source module 102, which may be accessed by a customer or user seeking to purchase tickets for a flight in an embodiment, central module 104, flight data repository 106, and transaction data repository 108. The user of the source module 102, using the disclosed embodiments, may be able to receive a prediction by the central module 104 regarding the risk of the flight being oversold, where the central module analyzes data relating to a flight the user has purchased or is seeking to purchase based on relevant inputs from the flight data repository 106, and transacting data repository 108.

Figure 6:
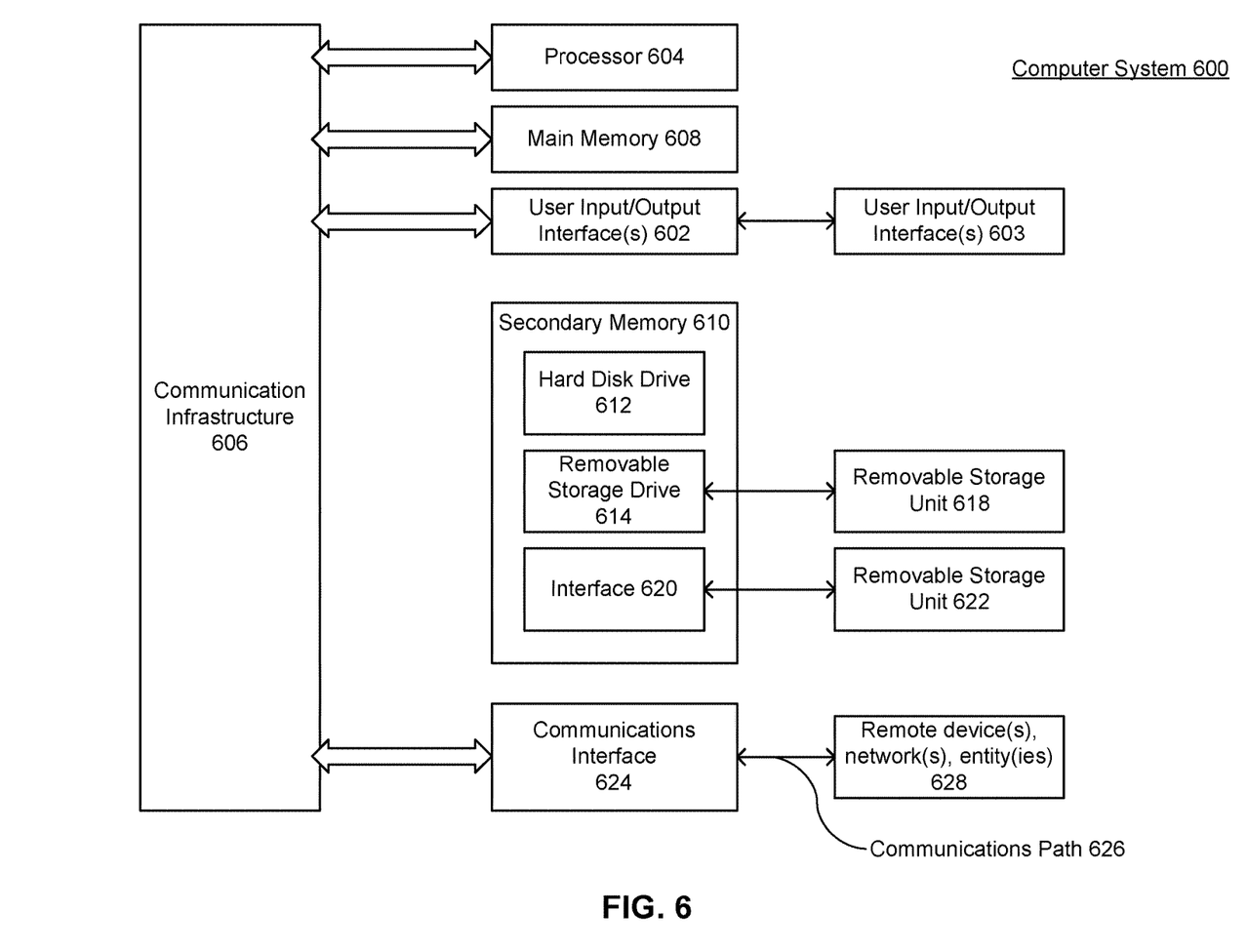
FIG. 6 is a block diagram of example components of the underlying structure of any of the systems presented in the following embodiments.

According to an embodiment, the central module 104 and the source module 102 may comprise one or more separate computer systems such as the computer system 600 shown in FIG. 6. According to an embodiment, the flight data repository 106, as well as the transacting data repository 108, may themselves comprise one or more separate computer systems such as the computer system 600, or the flight data repository 106 and the transacting data repository 108 may be present on an existing computer system 600 of the central module 102.

The embodiment of FIG. 2 is further explained herein, describing an active prediction process 200. In this mode, first, after the start of the process at step 202, the central module 104 is monitoring user browsing data in source module 102 for potential transaction data, as to whether a user is actively booking a flight. This data monitoring may take place through the data structure of, for example, an event listener, which may be present in a background application. An application of this type may be a cloud application 510*a* in FIG. 5, as described infra, which may be hosted by cloud computing environment 502 on the central module 104*a*, and running on the source module 102. Such an application 510*a* may also use a browser extension, which may in an embodiment be run by the central module 104 on the source module 102, on a browser run by the user within a computing system 600 included in the source module 102. In this manner, such an application may be able to receive feedback as the application host, as to whether a user such as the user of source module 102 is booking a flight. Such transaction data monitoring in step 202 may take place at a predetermined regular interval (e.g. on the scale of 1-100 milliseconds), or at irregular intervals. Such monitoring may also be reactively done in response to, for example, an event listeners being triggered by incoming user browsing data, whereby receipt of the data and checking of the data at step 204 to see if a flight is being booked could occur together.

At step 204, the central module 104 may check whether a flight is being booked on source module 102 through the event listener as described above. Feedback received in the form of browsing data, to be evaluated for potential transaction data, may be in the form of button-clicks, keyboard-stroke logging, detecting the loading of airlines' webpages through their URL, detecting the name of common airlines accessed by the user on a webpage within the browser, detecting a credit card transaction occurring in the user's browser regarding an airline purchase, detecting the accessing of any well-known plane travel website aggregator by the user within the browser, and the like. Such an assessment may include capturing user variables at every aforementioned regular or interval such as URL history, keystrokes in input forms, webpage data fields, accessing of virtual credit card payment systems, etc., and returning said variables to the central module 104.

Then, the returned feedback data may be parsed by the computing resources 510 of a hosted cloud computing environment 502 included as part of the central module 104, or as an application running in a memory as part of a computing system 600 of FIG. 6, which will be explained infra. After such parsing of the transaction data, the return feedback data may be analyzed by the computing resources 510, or the application running on the computing system 600, respectively, to determine whether a flight is being booked by the user of the source module 102. Such analysis may take place by comparing the parsed feedback data received from source module 102 to stored sorting data stored within flight data repository 106 or transaction data repository 108 including:
(1) a list of common airlines in the flight data repository 106,
(2) a list of commonly used flight aggregator sites, in the flight data repository 106,
(3) a list of the user's past credit card transactions in transaction data repository 108, or
(4) a list of common user form-inputs related to airline purchases by a plurality of users in the transaction data repository 108. The central module 104 is then able to determine at step 204 whether a flight is indeed being booked by the source module 102. Central module 104 may determine that a flight is being booked when:
(1) a "Book" button has been clicked on an airline webpage by a user and is returned as part of the parsed feedback data,
(2) the parsed return feedback data returns webpage fields data concerning an ongoing or completed credit card transaction, where if it is completed the transaction can be verified by matching with a list of the user's credit card transactions in transaction data repository 108.

If a flight is not being booked by the source module 102 ("NO" at step 204), the process returns to the monitoring step of 202, described above. If a flight is being booked by the source module 102 ("YES" at step 204), the process continues to step 206.

At step 206, the central module 104, through a browser extension or other application 510*a* as described infra, may be able to parse flight detail parameters and store said parameters in the flight data repository 106. Such parameters may include:
(1) date of flight
(2) time of flight
(3) the airlines being booked
(4) the name of the customer who the flight is being booked for
(5) the name of the customer who is purchasing the flight,
(6) number of passengers on flight
(7) frequent flyer mileage or ID numbers.

As with step 202, above, said parsing in step 206 may be conducted by the computing resources 510 of a hosted cloud computing environment 502 included as part of the central module 104, or as an application running in primary memory 608 or secondary memory 610 of a computing system 600 (e.g., the central module computing system 504) included as part of the central module 104.

In the parsing algorithm of step 206, if any of the information gathered is incomplete, for example if only the date of flight and flight numbers are known, the supplemental missing information (e.g. in the above example, to/from cities, time of flight, number of connections, airline, etc.) may be gathered from the flight data repository 106 or the transaction data repository 108. The flight data repository 106 may in an embodiment contain data gathered by using an application protocol interface (API) by the computing resources 510 to source data from the data systems of multiple airlines, or from an aggregator source storing such data, as well as weather for projected flight times, a history of level of bookings for flights to estimate a number of passengers on a certain flight, a history of weather for flights, etc. The transaction data repository 108 may contain information particular to a customer for a plurality of customers (e.g. credit card holders of a certain financial provider), such as frequent flyer ID numbers and membership information for different airlines, airline mileage rewards information, a history of flights taken, etc.

After a full set of parsed parameters are gathered at step 206, these parameters are aggregated with other generated parameters by central module 104 at step 210, and all of these parameters are then used as inputs in a prediction model in an embodiment. Alternatively, the parsed parameters may be used as inputs in the prediction model by themselves. Generated parameters may include:

(1) weather forecasts for the date to be flown obtained from flight data repository 106 by computing resources 510
(2) weather forecasts obtained by an external weather source which may include a networked entity 628 relative to computing resources 510
(3) a weather history for past years pertaining to the date to be flown from either the flight data repository 106 or an external weather source
(4) historical weather data in the dates proximate to the date within a predetermined time window (e.g. within one week, two weeks, one month, two months, etc.) pertaining to the level of bookings or how crowded similar flights between the same or similar source or destination cities have been from either the flight data repository 106 or an external source
(5) enhanced data from a credit card transaction conducted by the user of source module 102 to purchase the flight by utilizing computing resources 510 to search the transaction data repository 108 for user-related data, as well as search for the number of customers in the transaction data repository 108 that may have purchased or booked the same flight, or similar flights within a window of a predetermined time period, or in the past (annual history)
(6) the weather at any connections that the user is projected to go through on his/her flight
(7) the current frequency or cadence of purchases by users in the transaction data repository 108 for the flight within a predetermined time window or in the past (an annual history of frequency of purchase for the flight or similar flights, between the same source and destination cities)

Figure 5:
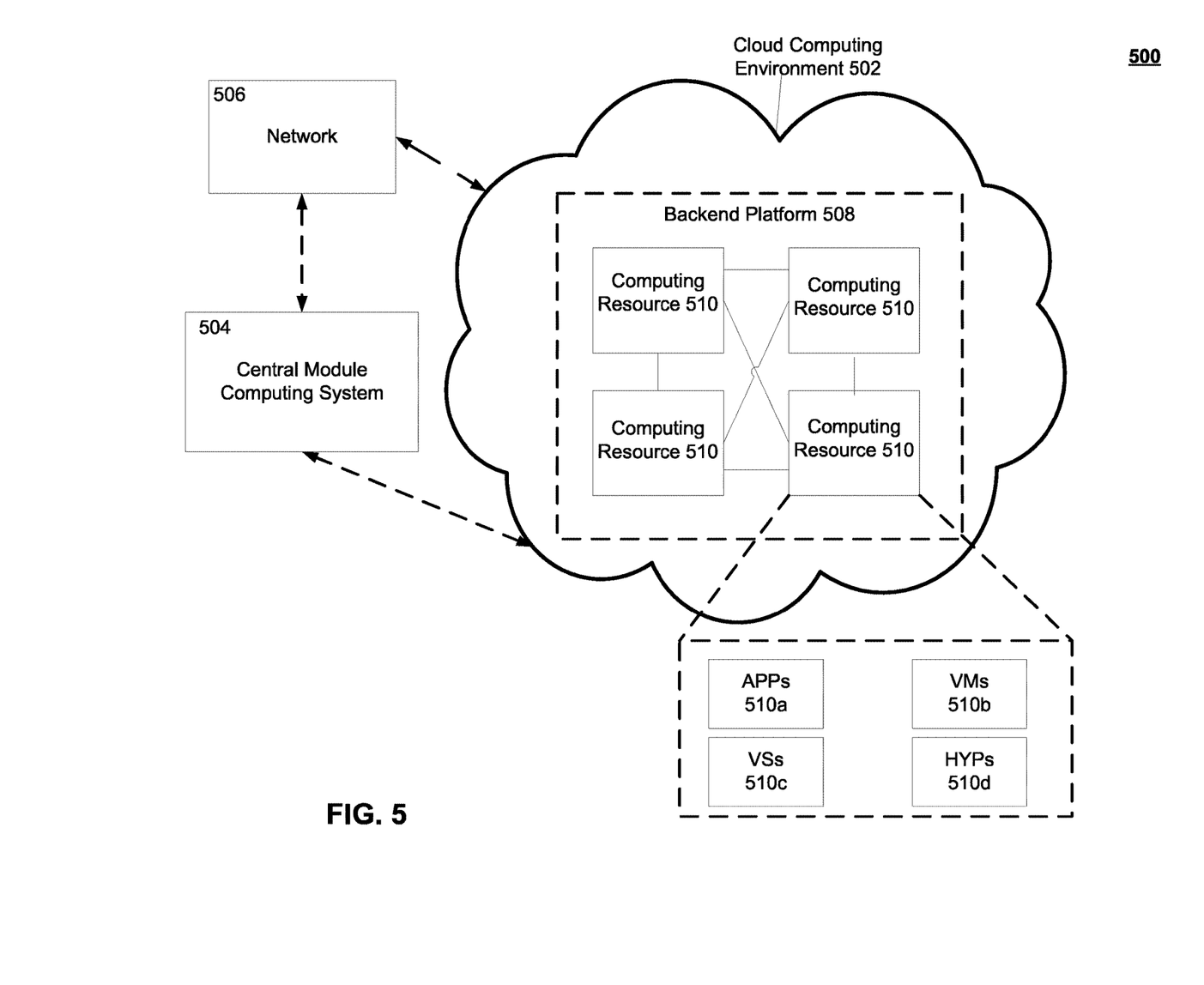
FIG. 5 is a block diagram of an example where a cloud computing environment may be accessed by a central module, according to an embodiment.

The aggregated and generated inputs are all used as inputs in a prediction model in step 210. The prediction model used in step 210 may comprise machine learning based logic which may, in an embodiment, include software executed from and stored on a computing system 600 included in the central module 104, such as the central module computing system 504 or one of the computing resources 510. Alternately, such machine-learning based logic may be executed from and stored as an application 510*a* within a computing resource 510*a* within the backend platform 508 of the cloud computing environment 502. Such a system could first generate its own additional inputs. For example, as part of the same or as a separate machine learning logic (of any of the types of machine-learning prediction models that will be discussed infra), the plurality of users in the transaction data repository 108 could be analyzed, such that each user may be classified according to profile types, such as a frequent purchaser or infrequent purchaser of tickets, as well as an economy spender or non-economy spender on tickets, etc.

By doing so, these classifications may be additional inputs that can be paired or coupled with the other inputs by the prediction model, such that the model can recognize not only the cadence of purchases by users in the transaction data repository 108 for the flight sought by the user of source module 102 within a predetermined time window or in the past, but also whether these purchases were mostly by economy or non-economy spenders, whether these purchases were by frequent or infrequent purchasers of tickets, etc. Furthermore, these classifications could also be used to indicate to the model additional information about the user, wherein for example, if the user of the source module 102 is a non-economy spender for the flight he or she is seeking to purchase, then this may affect chances of getting "bumped" from a flight as higher classes of tickets are less likely to get "bumped." As described above, the way these statistics could be determined for the user by the returned feedback data at step 204, and subsequent comparison by the central module 104 to the flight data repository 106 and the transaction data repository 108.

Finally, using all of the aggregated, generated, and machine-learning generated inputs, the prediction model could be run on all of these inputs. Such a prediction model may be logistical regression, or a decision-making structure, such as a random forest, support vector machine (SVM), or multi-tiered neural network, with or without back propagation, and with or without k-fold cross validation, K-nearest neighbors algorithm, bootstrap aggregation, naïve Bayes, etc. in order to classify the chances of the flight that the user of source module 102 has booked or is trying to book of being oversold. Such classification may occur according to several different paradigms and degrees. For example, while there may be 10 different classes which the risk is sorted into, one marking each decile of risk, from 0-100%, there may only also be two different classes, one for high risk, and one for low risk. The number and size of classifications may be accurately balanced to maximize specificity while also retaining accuracy.

All the inputs described above may be monitored over time, including flight history, weather history, etc., in order to train the machine learning algorithm to rank features according to classifier weights (normally the weather of a connecting city may matter more than the day the flight is being booked and the weights may be adjusted accordingly), and the model can also monitor for special conditions (e.g. if the day of booking closer to a holiday such as July 4th or Memorial Day has more of an impact on bookings being oversold than the weather of a connecting city does, then the machine learning model may adjust its weights accordingly).

One example of training is the SVM, where features having the smallest weights are removed and the algorithm is re-trained with the remaining weights, wherein said process is repeated until features remain that are able to accurately separate the data into different patterns or classes. In this manner, a multi-dimensional separating hyperplane may be constructed. Alternately, a neural network type algorithm may be used, such as a back-propagation neural network, where there may be a weight matrix for each layer of the neural network, wherein for each layer a bias vector is defined. The weights are then multiplied by the input signals, and applying activation functions, the output may be calculated. Back propagation aids in computing the error of partial derivatives, which can then be minimized across layers, and can form the central mechanism by which the neural network learns. This may aid in discovering trends for classification wherein resources of a particular input may be more likely to be used (e.g. as mentioned above, flights may be more likely to sell out in terrible weather, or closer to a holiday).

In this manner, the machine-learning based monitoring system could monitor several input variables at once, as described above, for various classification schemes. Several of these decision making structures may also be used in parallel to give different populations of results. Given the stochastic nature of machine-learning algorithms, a mean expected performance from two algorithms run simultaneously, may be calculated. Statistical significance tests such as a p-value or t-value test (one sample p or t test, two-sample p or t test, etc.) could be used for interpreting results.

A one-way ANOVA test may also be performed to check whether there is any difference in their performance, and then follow up with post-hoc test, such as Tukey's test, to identify if classifiers exhibit significant differences. Furthermore, such a prediction model may provide uncertainty estimation (e.g., through a monte carlo estimate). Such an uncertainty estimation may be in the form of a confidence interval for error rate.

Through such tests, the situation when there may be a greater likelihood than a predetermined threshold (e.g. a 20-30% chance threshold) of a flight being oversold can be identified (e.g. in the case with two classifications described above, one may be a "oversold likely" class where there is a greater likelihood than the predetermined threshold, and an "oversold unlikely" class where there is a less likelihood than the predetermined threshold, or if there are ten classifications, then any predictions in the fourth class or higher may be more likely to be oversold with regard to the predetermined threshold, while any predictions in the third class or lower may not be likely to be oversold with regard to the predetermined threshold). If there is a greater likelihood than the predetermined threshold that the flight will be oversold, further machine-learning logic in an analogous manner can be run as an additional machine learning prediction model to determine whether the likelihood of the flight being oversold also means that there is a high likelihood that the user of source module 102 would be "bumped" from the flight (e.g. if the user is a non-economy spender and has a first-class ticket, even though there is a high likelihood that the flight which the user is purchasing may be oversold, the probability that the user is bumped may be very low). Classifications for this additional prediction model may include any number (e.g. where there are two classes there may only be an indication of likelihood or non-likelihood of being bumped, whereas if there are three classes for the model then a high, medium, or low likelihood of being bumped may be indicated to the user).

After the tests are conducted by the prediction model, if the situation where the model has predicted where there may be a greater likelihood than a predetermined threshold as per the machine-learning based classification schema discussed above (YES at step 212), it may then notify the user in a number of different ways in step 214. In alternate embodiment, step 212 may be omitted, and the prediction model may convey results to the user at step 214 regardless of whether there is a greater likelihood than a predetermined threshold of the flight being oversold or not. In an embodiment, the user is alerted to the chances of the flight being oversold before he/she completes their transaction, especially if it is an ongoing transaction, as described above.

At step 214, results of the prediction model can be conveyed to the user of the source module 102 in several different ways. For example, if the user is in the process of booking a flight or has just booked a flight which has a high likelihood of being oversold, then this may be indicated to the user through a background application 510a, such as a browser extension, within the browser itself. This may occur, for example, by the central module 104, based on the results of the prediction model, sending commands through the browser extension or other background application 510a, to alter the webpage being displayed on the browser of the user within the source module 102 by, for example, altering the document object model of the webpage by altering a CSS or HTML style-based element.

For example, in the case that there are two classifications in the prediction model (as discussed above, where one may be "oversold likely" and another may be "oversold unlikely" with regard to the predetermined threshold), existing flight confirmation text may be bolded in a bright-green color to give a near real-time indication to the customer that his or her potential or recently-completed flight purchase has a likelihood where it will not be oversold, or it might be alternately bolded in a bright-red color to give a near real-time indication to the customer that the flight purchase has a grave potential of being oversold. Similar operations could be performed when there are three classifications (can display red for a high potential of danger of being oversold, yellow for medium potential of danger of being oversold, and green for there being low potential of danger of being oversold), four classifications, and so on, up to ten classifications or more. Furthermore, instead of bolding existing flight confirmation or other flight-relevant text being displayed in the webpage, the central module 104 may also send a command through the background application 510a to display new text or another new element such as a graphic on the webpage through altering of CSS, HTML tags, other HTML5 code, and the like. In an analogous manner, if the predicted likelihood is high that a flight may be oversold, then the further calculated prediction of whether the individual user using the source module 102 is likely to be "bumped" may also be displayed by bolding existing text in a different unused color, or displaying new text in an already used color wherein the text specifically states whether there is a low or high risk of the user being bumped (e.g. in the case where red is used to give an indication to the customer that the flight purchase has a likely potential of being oversold, the same red color may also be used to indicate that the user using source module 102 may be "bumped" if the text is new text specifically stating there is a high risk of the user being bumped, etc.).

Figure 4:
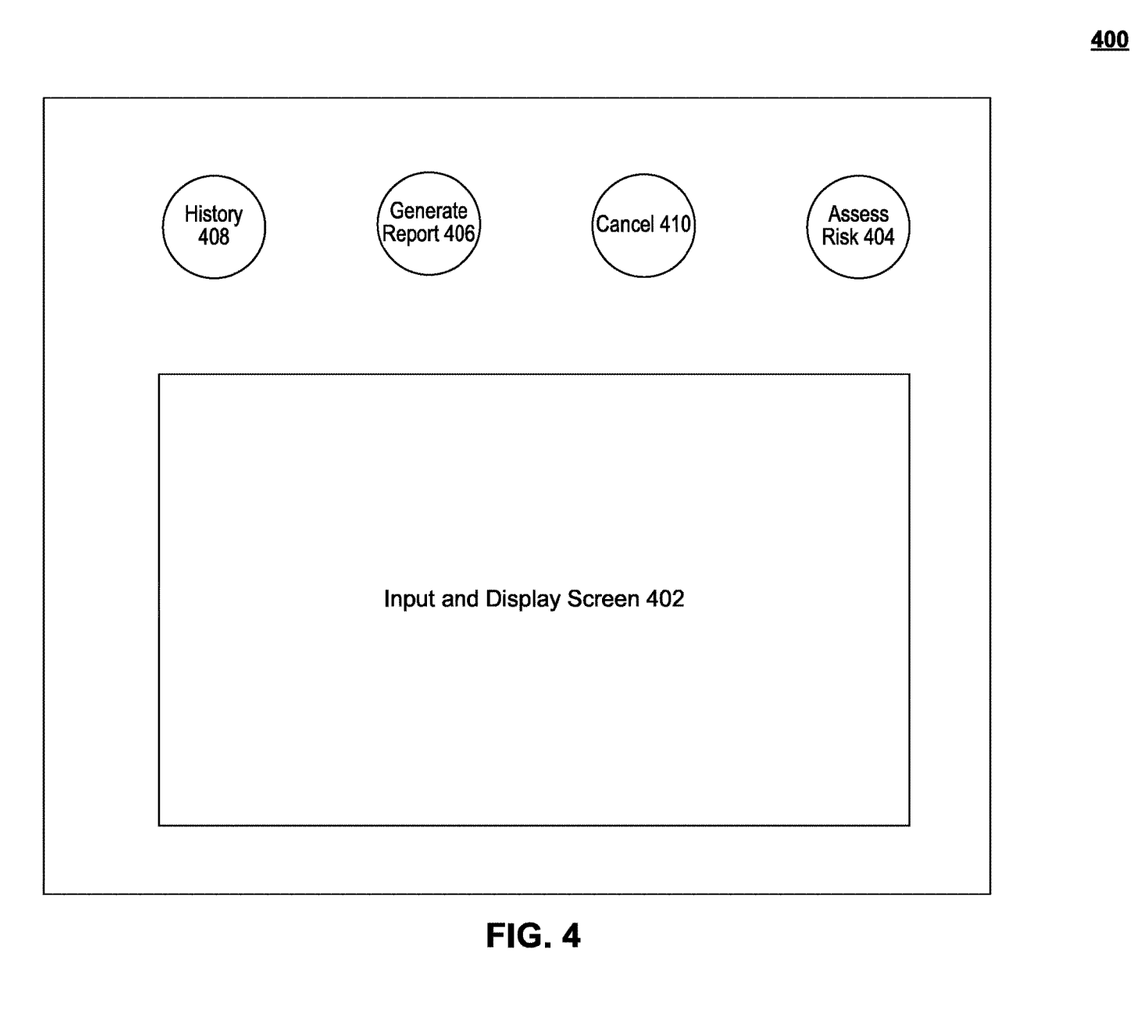
FIG. 4 is an example graphical user interface which may be run on a source module by a central module.

Furthermore, the central module 104 may use the browser extension or other background application 510a display its own window 400 as a separate browser or application window of the source module 102 (e.g. on a monitor 603 where said application may be in primary 608 or secondary memory 610), such as the window shown in FIG. 4. This window is a graphical user interface (GUI), presenting an option to the user to enter the flight data in the window themselves. Alternately, if the flight booking is detected as described earlier in step 204, the central module may display information regarding the flight booking in the input and display screen pane 402 of the window 400 shown in FIG. 4 as an alternate to the CSS/HTML modification described above, as another mode of real-time notification.

This graphical user interface (GUI) 400 offers the advantage of consolidated information and provides several user-friendly features and functionalities. First, by clicking on the History button 408, the central module 104 receives a request by the user, query all previous user flight purchase history for flights similar to the potential flight being purchased (in terms of from/to source and destination cities, price range, time of year, or any other criteria previously discussed), and then display the results of said query to the user in the display pane 402 within window 400. This offers the user a quick way of self-comparing to show potential insights for current decision making. This may be presented in a tabular or graphical format to the user, wherein the graphical format may have a timeline on the x-axis, and a measure such as overcrowding on the y-axis.

When the user has received prediction results, which may be displayed in the input and display screen pane 402 as described above, if the user clicks on the Generate Report button 406, the central module 104 receives a request by the user, for generating a user-friendly report in a document format, which it then sends to the source module 102. This may then be received by the source module 102, and can additionally be downloaded onto the hard disk 612 of a computing system 600 included in the source module 102 or any other form of memory storage contemplated by the source module 102 discussed above.

Further, the GUI 400 may also be able to switch between the two embodiments of FIG. 2 described above, including and omitting step 212. If the user clicks on Assess Risk 404 in the GUI, the central module 104 receives a request by the user for assessing the risk via the prediction model, for example even when the classification is such that it is lower than a predetermined threshold of likelihood for the flight being oversold, such that it may switch to the embodiment of FIG. 2 discussed above, where the results of the prediction model may be reported on the input and display screen 402 of the GUI 400, regardless of whether the predetermined threshold is met in step 212 or not. If the assess risk 404 button is clicked again, and the central module 104 receives another request for assessing the risk via the prediction model, it may revert to the embodiment of FIG. 2 which included step 212, such that the predicted risk may be reported to the user on input and display screen pane 402 of the GUI 400 only if the predicted risk exceeds a predetermined threshold as per step 212. By timely receiving an indication of high risk of a flight overselling, the customer is able to avoid bumping, allowing flight seating to be used more efficiently, and avoids unnecessary processing in finding new flights. Moreover, if the customer is alerted in an ongoing transaction that there is a risk the flight will be oversold, he/she can avoid or engage such a circumstance accordingly, without having to, e.g., go through the hassle of charging their credit card, then cancelling the transaction and waiting for a refund, which may cause money-flow issues.

The reactive prediction method 300 of FIG. 3 operates in a largely analogous manner to the method of FIG. 2, and for purposes of conciseness, description of analogous steps will not be repeated. At step 302, the operation occurs reactively, and is different from that of step 202. As opposed to the background application 510*a* of step 202 which may be a browser extension, and takes place through the data structure of, for example, an event listener, in step 302 there is a passive mode of monitoring conducted on the transaction data repository 108. This type of monitoring may be conducted by a different type of background application 510*a* using computing resources 510, or alternately may be an application present in the primary 608 or secondary memory 610 of a computing system of the type of computing system 600 included in the central module 104. Such an application on the central module 104 may carry out checks at regular (e.g. in the 1-100 millisecond range, every 10 minutes, every hour, every week, etc.) or irregular intervals, performing an inventory check of a series of transactions (e.g., credit card transactions) present within the transaction data repository 108, at step 304. In an embodiment, such as when a new transaction or a certain number of new transactions are received within the transaction data repository 108 an inventory check of the transaction data repository 108 may be made. The application of the central module 104 upon performing such an inventory check, through reading internal metadata, for each transaction, may discover that the transaction is or is not directed to a flight at step 306.

In this manner, with inventory checks being performed, the method 300 is able to quickly discover whether a flight is booked by user transactions, e.g. credit card transactions, and nearly instantaneously convey risk-related information to the user. In this manner, the user may be duly informed of the risk of the flight overselling before the 24-hour period after the completion of the transaction purchasing a flight has passed. This is very important as flights for several airlines are only able to be canceled without additional fees, or with nominal additional fees, within a 24-hour period after the transaction of purchasing a flight is completed.

To further support the user in cancelling their transaction, a cancel button 410 may be included in the in the GUI 400, wherein if the user uses a browser extension or other background application 510, upon receipt of the conveyed risk of a flight overselling, the user may easily be able to cancel such a flight, by entering the flight criteria as described above into the input and display screen 402, and clicking the cancel button 410. Doing so may autogenerate an email for sending to the airline with the user's information for indicating the user's intention to cancel the flight to the airline. In an embodiment clicking the button may perform the tasks of both autogenerating the email and sending the email to the airline immediately thereafter.

Additionally, such an inventory check at step 304 may also include scanning a user's email records in an embodiment (e.g., the background application running on the central module 104 may be able to retrieve data from a user using the source module 102 pertaining to the user's email records, which may be present for example within secondary memory 610 of a computing system 600 included in the source module 102, to scan said records to determine if they contain any information related to booking of a flight). The emails are scanned in an analogous manner to the way webpages were searched for flight bookings in the method of FIG. 2.

If the transaction is directed to a flight (YES at step 306) it may gather detailed parsed flight parameters in step 308, which is analogous to step 206. Conversely, if the transaction is not directed to a flight (NO at step 306), then the process may proceed through remaining transactions, and if all are completed with no finding of a flight transaction, may exit.

Steps 308, 310, and 312, 314 proceed in an analogous manner to steps 206, 208, 210, and 212. In the notification step 316, the user whose transaction was detected to be a flight booking at step 306 may be notified in an autonomous manner if the predicted likelihood of the flight being oversold exceeds a predetermined threshold as described above, where the user may not have to take any actions such as having a browser window open at all, wherein the central module 104 may, for example, proactively alert the user by sending an SMS or email to the user of the source module 102 based on the user's transaction data in transaction data repository 108, wherein corresponding personal user information for all users whose transactions are present may also be present in the transaction data repository 108 in an embodiment. As a result, the process of FIG. 3 in such a situation is end-to-end reactive and autonomous, wherein the user did not proactively have to perform a single step, and the method served as a reactive method to the user's initial transaction present in the transaction data repository 108. Other possible methods of notification may be with a browser extension forming a separate background application 510*a* that the user may have open within their web browser, following the methodology of FIG. 4 as discussed above, wherein the process 300 in FIG. 3 may detect if the user who is to be notified also has a browser extension open, and may prefer to display prediction information by the central module 104 onto the display screen 400 of a GUI window 400. In this case, if the user does not have their browser open, then the process 300 may revert to sending an email or SMS to the user. In this manner, it can be ensured that the user receives the notification in the fastest way possible, such that it can be displayed in front of them. Any such combination or permutation of notification methods may be possible. Additional notification methods may include a push notification on a mobile IOS or Android application, autodialing and calling the user, sending a message to an operator to call user, or altering CS S/HTML elements of document object models displayed inside the web browser of a user.

To aid in describing the methods of FIG. 2 and FIG. 3 that follow, an example embodiment of the underlying structure will be described. The underlying structure of a computer system 600, shown in FIG. 6, can implement a database and the sending and receiving of data. Although such a computer system, may, according to the embodiments describe above, include source module 102, central module 104, flight data repository 106, and transaction data repository 108, in the embodiments described below source module 102 and central module 104 lie on different computer systems 600. Computer system 600 may include one or more processors (also called central processing units, or CPUs), such as a processor 604. Processor 604 may be connected to a communication infrastructure or bus 606.

Computer system 600 may be virtualized, or it may also include user input/output devices 603, such as monitors, keyboards, pointing devices, etc., which may communicate with communication infrastructure 606 through user input/output interface(s) 602.

One or more processors 604 may be a graphics processing unit (GPU). In an embodiment, a GPU may be a processor that is a specialized electronic circuit designed to process table data received from the flight data repository 106 as well as the transaction data repository 108 when data is to be processed in a mass quantity, for example for parsing relevant customer data from said repositories and using the machine learning logic (which will be described infra) for making prediction assessments regarding the overselling of flights for a particular customer. The GPU may have a parallel structure that is efficient for parallel processing of large blocks of data, such as mathematically intensive data common to computer graphics applications, images, videos, word-processing documents, PDF files, and the like, any of which can include table data received from flight data repository 106 and transaction data repository 108 as described above.

Computer system 600 can also include a main or primary memory 608, such as random access memory (RAM). Main memory 608 can include one or more levels of cache (including secondary cache).

Computer system 600 can also include one or more secondary storage devices or memory 610. Secondary memory 610 may include, for example, a hard disk drive 612 and/or a removable storage device or drive 614, which may interact with a Raid array 616, which may combine multiple physical hard disk drive components (such as SSD or SATA-based disk drives) into one or more logical units, or a removable storage unit 618. Removable storage unit 618 may include a computer usable or readable storage device having stored thereon computer software (control logic) and/or data, including remotely accessed network drives. Removable storage unit 618 may also be a program cartridge and cartridge interface, a removable memory chip (such as EPROM or PROM) and associated socket, a memory stick and USB port, a memory card and associate memory card slot, and/or any other removable storage unit and associated interface. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote entities 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination, and may be used for sending or receiving data (e.g. between any of the source module 102, the central module 104, the flight data repository 106 and the transaction data repository 108 in FIG. 1). Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Computer system 600 may be a client or server, accessing or hosting any applications and/or data through any delivery paradigm, including but not limited to remote or distributed cloud computing solutions such as cloud computing environment 502 which will be explained infra; local or onpremises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

In implementing each of the flight data repository 106 and transaction data repository 108, as an example approach, the computer system 600 may use an in-memory database with persistence, which may store and access data objects from the primary memory 608 of the computer system 600 with a transaction log for persistence being stored in secondary memory 610. Such a database can be used for storing and accessing the constituent data objects of these repositories, where transaction data based on monitoring user sessions is parsed into the flight data repository 106, and the transaction data repository 108 contains transaction data information for a plurality of customers. In an embodiment the transaction data information for a plurality of customers may include credit card transactions and records of each purchase, merchant, date, company, additional details of purchase, etc. from a past date up to the current date of user interaction for each customer of the plurality of customers.

Alternatively, for storing and accessing the constituent data objects of these repositories, the computer system 600 may implement only part of the data present as an in-memory database, using less primary memory 608 than the first embodiment as described above, to reduce the in-memory footprint, and may instead store a larger portion of the data as a disk-based database within the secondary memory 610 (more frequently accessed data is stored in primary memory 608 while less frequently accessed data is stored in secondary memory 610).

If any of the flight data repository 106 or the transaction data repository 108 is implemented as a separate system 600, it may send data to linked network entities through e.g. an internal network, the internet, etc. through the communication or network interface 624, wherein the source module 102 and central module 104 may comprise entities 628 present on an internal or external network, which may be accessed through communications path 626. Alternatively, if the central module 104 is present along with flight data repository 106 as well as transaction data repository 108 jointly in a computer system 600, the computer system 600 may implement the database using the communication infrastructure 606 for communication between the central module 104, flight data repository 106, and transaction data repository 108, but may send data to the source module 102 through the communications interface 624, through communications path 626, where central module 102 is a network entity 628. Further alternatively, an embodiment where only one of the flight data repository 106 or transaction data repository 108 is present with the central module 104 in a computer system 600 may be envisioned. In this embodiment, the remaining repository 106 or 108 may be a separate computer system 600, wherein communication between these entities would take place in an analogous manner to the aforementioned embodiments, meaning for entities within the same computer system 600 communication would occur through the communication infrastructure 606, and for entities linked by networks communication would occur through communications path 626.

As shown in FIG. 5, cloud computing environment 502 may contain backend platform 508, in a block diagram of an example environment 500 in which systems and/or methods described herein may be implemented. The central module 104 of FIG. 1, described above, may also include a host such as cloud computing environment 502. The cloud computing environment 502 may be accessed by the central module computing system 504, of the same type of computing system 600 as described above, wherein in an embodiment the central module computing system 504 is included in the central module 104. In this case, the central module computing system 504 of FIG. 6 may access the cloud computing environment 502 by a communication or network interface 624 as shown in FIG. 6, wherein a network gateway 506 may comprise a remote entity 628 accessed by the communications path 626 of the central module computing system (where the three entities 502, 504, and 506 shown in FIG. 5 would correspond to the central module 104 of FIG. 1). Alternately, the computing cloud environment 502 itself may correspond to a remote entity 628 in FIG. 6, and may be accessed directly by the central module computing system 504 through a communications path 626, for example through an application protocol interface (API), eliminating the need for a network gateway 506 (both options are shown in FIG. 5, wherein the flow path above the central module computing system 504 uses a network gateway 506, and the flow path below the central module computing system 504 connects directly to the cloud computing environment 502, both shown using dashed bi-directional lines).

The devices of the environments 500 and 100 may be connected through wired connections, wireless connections, or a combination of wired and wireless connections.

In an example embodiment, one or more portions of the data transfer environment 100 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

As explained above, the central module 104 of FIG. 1 may have a central module computing system 504 as shown in FIG. 5 comprising a computer system of the same type as the computer system 600 as shown in FIG. 6. The source module 102 or the flight data repository 106 or the transaction data repository 108 may access the central module 104 through the central module computing system 504, wherein the source module 102 or the flight data repository or the transaction data repository 108 may be external network entities 628 from the perspective of the central module computing system 504 in an embodiment, and may send data back and forth in the form of data packets through the communications path 626 of the communications interface 624 of computing system 504, using e.g., TCP/UDP/FTP/HTML5 protocol. Alternately, the source module 102 may access the central module 104 through a front-end application 510a (e.g. a web browser application, a web browser extension, proprietary OS application, standalone executable application, command line access shell program, FTP/UDP/TCP/HTML5 protocol, etc.) hosted as an application 510a on a computing resource 510 (explained infra) within the cloud computing environment 502 hosted by the central module 104, in an embodiment.

The backend platform 508 in FIG. 5 may include a server or a group of servers. In an embodiment, the backend platform 504 may host a cloud computing environment 502. It may be appreciated that the backend platform 502 may not be cloud-based, or may be partially cloud-based.

The cloud computing environment 502 includes an environment that delivers computing as a service ("CaaS" as described above), whereby shared resources, services, etc. may be provided to the central module computing system 504 and/or the backend platform 508. The cloud computing environment 502 may provide computation, software, data access, storage, and/or other services that do not require end-user knowledge of a physical location and configuration of a system and/or a device that delivers the services. For example, the central module computing system 504, as well as source module 102 may receive data stored within or hosted on a database within computing resources 510 within the backend platform 508, through an application protocol interface (API) or any of the various communication protocols previously listed. The cloud computing environment 502 may include computing resources 510.

Each computing resource 510 includes one or more personal computers, workstations, computers, server devices, or other types of computation and/or communication devices of the type such as computer system 600 described above. The computing resource(s) 510 may host the backend platform 508. The cloud computing resources may include compute instances executing in the cloud computing resources 510. The cloud computing resources 510 may communicate with other cloud computing resources 510 via wired connections, wireless connections, or a combination of wired or wireless connections as described above.

Computing resources 510 may include a group of cloud resources, such as one or more applications ("APPs") 510a, one or more virtual machines ("VMs") 510b, virtualized storage ("VS") 510c, and one or more hypervisors ("HYPs") 510d.

An application 510a may include one or more software applications that may be provided to or accessed by a computer system 600. In an embodiment, the central module 104 may only include a cloud computing environment 502 executing locally on a computer system 600 of the central module computing system 504. The application 510a may include software associated with backend platform 508 and/or any other software configured to be provided across the cloud computing environment 502 (e.g. to source module 102). The application 510a may send/receive information from one or more other applications 510a, via one or more of the virtual machines 510b. Computing resources 510 may be able to access each other's applications 510a through virtual machines 510b, in this manner. In an alternate embodiment, a separate central module computing system 504 is not needed, and the central module 104 only comprises the cloud computing environment 502, hosted and executed by computing resources 510, and communicating with the source module 102 using the communications interface 624 of one of the computing resources 510, or via app 510a, using any of the various communication protocols mentioned above.

Virtual machine 510b may include a software implementation of a machine (e.g., a computer) that executes programs like a physical machine. This may be of particular use in the alternate embodiment where there is no separate central module computing system 504 of the type of computer system 600. In this embodiment, the central module computing system 504 may be a virtualized machine 510b, and may communicate with source module 102 using the various communication protocols listed above, via an application 510a. Virtual machine 510b may be either a system virtual machine or a process virtual machine. A system virtual machine may provide a complete system platform that supports execution of a complete operating system (OS). A process virtual machine may execute a single program and may support a single process. The virtual machine 510b may execute on behalf of a user (e.g., the administrator of the central module 104) and/or on behalf of one or more other backend platforms 508, and may manage infrastructure of cloud computing environment 502, such as data management, synchronization, or long duration data transfers, and accessing the flight data repository 106 and transaction data repository 108.

Virtualized storage 510c may include one or more storage systems and/or one or more devices that use virtualization techniques within the storage systems or devices of computing resource 510. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the central module 104 flexibility in how they manage storage for evaluation data from processing of data accessed from the flight data repository 106 and the transaction data repository 108 (as will be explained infra), as well as prediction notifications designated for different end users at the source module 102. File virtualization may eliminate dependencies between data accessed at a file level and location where files are physically stored. This manner of block and file virtualization may enable optimization of storage use, server consolidation, and/or performance of non-disruptive file migrations.

Hypervisor 510d may provide hardware virtualization techniques that allow multiple operations systems (e.g., "guest operating systems") to execute concurrently on a host computer, such as computing resource 510, which may include a computing system of the type of computing system 600, and can in this manner host a virtualized hardware of a central module computing system 504. Hypervisor 510d may present a virtual operating platform to the guest operating systems, and may manage multiple instances of a variety of operating systems as these "guest operating systems," which may share virtualized hardware resource, such as RAM, which may for instance access the data in the form of a database of the flight data repository 106 or the transaction data repository 108. Alternately, secondary memory may be accessed using virtualized storage 510c, or on physical storage, such as the hard disk drive 612, of a computing resource 510 of the type of computing system as computing system 600. In embodiments heretofore described, using a combination of RAM and secondary memory to access the database, such that a portion of the database may be in-memory and a portion of the database stored in files, is also envisioned. Further, source module 102 may also include an environment 500 with a cloud computing environment 502, instead of only a computing system of the type of computing system 600.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The Applicant rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method by one or more central computing devices for determining flight characteristics, the method comprising:
    monitoring user browsing data of a user that is attempting to book a ticket for a flight, in a browser, by the one or more computing devices as potential transaction data, through an event listener;
    parsing parameters from the user browsing data including at least a date for which the flight is being booked;
    checking whether the parsed parameters indicate that the user is in the process of booking the flight; and
    in response to the checking indicating that the flight is being booked:
        retrieving values of additional parameters from values of the parsed parameters, including a parameter for weather of a connecting city of the flight for the date for which the flight is being booked, a parameter for available seat capacity, and a parameter for a number of days until departure;
        feeding the values of the parsed and the additional parameters as input values, into a multi-layer neural network machine learning model wherein each of the parsed and generated additional parameters are input features;
        interpreting values of an output layer of the machine learning model to predict a likelihood of the flight becoming overbooked;
        based on the predicted likelihood of the flight being overbooked, notifying the user of the likelihood before the booking has been made, within the browser;
        assigning a greater weight to the input feature of the weather of the connecting city of the flight than the input feature of the date of the flight, at an input layer of the neural network machine learning model, when the value of the date of the flight is not within a predetermined first number of days from a holiday;
        assigning a greater weight to the input feature of the date of the flight than the input feature of the weather of the connecting city, at the input layer of the neural network machine learning model, when the value of the date of the flight is within the first number of days from a holiday; and
    training the machine learning model using historical transaction data indicative of overbooked, or non-overbooked flights, for a plurality of users,
    wherein the indication of overbooked, or non-overbooked flights is used at the output layer of the neural network machine learning model in a back propagation process, aiding in computing error of partial derivatives that is minimized across layers, and adjusting weights of the input layer of the model.

2. The method of claim 1,
   wherein the user browsing data comprises one or more of:
    (a) button-clicks, (b) keyboard-stroke logs, (c) capture of user input in forms and webpage data fields via the event listener, (d) records of detection of loading of airlines' webpages through their URL by the user, (e) detection of names of common airlines accessed by the user on a webpage within the browser, (f) detection of a credit card transaction occurring in the user's browser regarding an airline purchase, and (g) detection of the user accessing a well-known plane travel website aggregator by the user within the browser.

3. The method of claim 1, wherein the monitoring of user browsing data occurs simultaneously while the user is making the booking, before the user has finished making the booking.

4. The method of claim 1, wherein the checking whether the parsed parameters indicate that a flight is being booked comprises:
    comparing the parsed parameters to at least one of: (a) a list of the user's past credit card transactions in a transaction data repository, (b) a list of commonly used flight aggregator sites and airlines in a flight data repository, and (c) a list of common user form-inputs associated with airline purchases in the transaction data repository.

5. The method of claim 1,
    wherein the attempting to book the ticket occurs on the one or more computing devices.

6. The method of claim 1, further comprising:
    wherein the network machine learning model has additional inputs for predicting the likelihood of the flight being overbooked including one or more of:
    time of booking;
    airline being booked;
    name of the customer who the flight is being booked for;
    number of passengers on the booking;
    name of the customer who is purchasing the flight;
    frequent flyer mileage or ID numbers;
    weather history for past years pertaining to the date of the booking;
    historical weather data in the dates proximate to the date of the booking within a predetermined time window;

number of customers in a transaction data repository that may have purchased or booked the same flight;

profile type of the user as a frequent or infrequent purchaser of tickets;

profile type of the user as an economy spender or non-economy spender on tickets; and wherein a machine learning logic operates on the inputs, and indicates the risk of overbooking to the user in one of ten risk classes as an output, sorted by decile of risk, wherein when the risk of overbooking is in the fourth class or higher, it is indicated to the user as likely to be oversold, and when the risk of overbooking is in the third class or lower, it is indicated to the user as not likely to be oversold.

7. A system comprising a memory, a computer microprocessor coupled to the memory, and a flight information repository for storing flight data, configured to perform operations comprising:

monitoring user browsing data of a user that is attempting to book a ticket for a flight, in a browser, as potential transaction data, through an event listener;

parsing parameters from the user browsing data including at least a date for which the flight is being booked;

checking whether the parsed parameters indicate that the user is in the process of booking the flight; and in response to the checking indicating that the flight is being booked:

storing the parsed parameters in the flight information repository;

retrieving values of additional parameters from values of the parsed parameters, including a parameter for weather of a connecting city of the flight for the date for which the flight is being booked, a parameter for available seat capacity, and a parameter for a number of days until departure;

feeding the values of the parsed and the additional parameters as input values, into a multi-layer neural network machine learning model wherein each of the parsed and generated additional parameters are input features;

interpreting values of an output layer of the machine learning model to predict a likelihood of the flight becoming overbooked;

based on the predicted likelihood of the flight being overbooked, notifying the user of the likelihood before the booking has been made, within the browser;

assigning a greater weight to the input feature of the weather of the connecting city of the flight than the input feature of the date of the flight, at the input layer of the neural network machine learning model, when the value of the date of the flight is not within a predetermined first number of days from a holiday;

assigning a greater weight to the input feature of the date of the flight than the input feature of the weather of the connecting city of the flight, at an input layer of the neural network machine learning model, when the value of the date of the flight is within the first number of days from a holiday; and training the machine learning model using historical transaction data indicative of overbooked, or non-overbooked flights, for a plurality of users, wherein the indication of overbooked, or non-overbooked flights is used at the output layer of the neural network machine learning model in a back propagation process, aiding in computing error of partial derivatives that is minimized across layers, and adjusting weights of the input layer of the model.

8. The system of claim 7, wherein the user browsing data comprises one or more of: (a) button-clicks, (b) keyboard-stroke logs, (c) capture of user input in forms and webpage data fields via the event listener, (d) records of detection of loading of airlines' webpages through their URL by the user, (e) detection of names of common airlines accessed by the user on a webpage within the browser, (f) detection of a credit card transaction occurring in the user's browser regarding an airline purchase, and (g) detection of the user accessing a well-known plane travel website aggregator by the user within the browser.

9. The system of claim 7, where the system is further configured to:

simultaneously monitor the user browsing data while the user is making the booking, before the user has finished making the booking.

10. The system of claim 7, the checking operation further comprising:

compare the parsed parameters to at least one of: (a) a list of the user's past credit card transactions in a transaction data repository, (b) a list of commonly used flight aggregator sites and airlines in a flight data repository, and (c) a list of common user form-inputs associated with airline purchases in the transaction data repository.

11. The system of claim 7, the prediction operation further comprising:

wherein the neural network machine learning model has additional inputs for the predicting of the likelihood of the flight being overbooked including one or more of:

time of booking;

airline being booked;

name of the customer who the flight is being booked for;

number of passengers on the booking;

name of the customer who is purchasing the flight;

frequent flyer mileage or ID numbers;

weather forecasts for the date of the booking;

weather history for past years pertaining to the date of the booking;

historical weather data in the dates proximate to the date of the booking within a predetermined time window;

number of customers in a transaction data repository that may have purchased or booked the same flight;

profile type of the user as a frequent or infrequent purchaser of tickets;

profile type of the user as an economy spender or non-economy spender on tickets; and wherein a machine learning logic operates on the inputs, and indicates the risk of overbooking for a user in one of ten risk classes as an output, sorted by decile of risk, wherein when the risk of overbooking is in the fourth class or higher, it is indicated to the user as likely to be oversold, and when the risk of overbooking is in the third class or lower, it is indicated to the user as not likely to be oversold.

12. A non-transitory computer-readable storage device having instructions stored thereon that, when executed by at least one central computing device, causes the at least one computing device to perform operations comprising:

monitoring user browsing data of a user that is attempting to book a ticket for a flight, in a browser, by the at least one computing device as potential transaction data, through an event listener;

parsing parameters from the user browsing data including at least a date for which the flight is being booked;

checking whether the parsed parameters indicate that the user is in the process of booking the flight; and in response to the checking indicating that the flight is being booked:

retrieving values of additional parameters from values of the parsed parameters, including a parameter for weather of a connecting city of the flight for the date for which the flight is being booked, a parameter for available seat capacity, and a parameter for a number of days until departure;

feeding the values of the parsed and the additional parameters as input values, into a multi-layer neural network machine learning model wherein each of the parsed and generated additional parameters are input features;

interpreting values of an output layer of the machine learning model to predict a likelihood of the flight becoming overbooked;

based on the predicted likelihood of the flight being overbooked, notifying the user of the likelihood before the booking has been made within the browser;

assigning a greater weight to the input feature of the weather of the connecting city of the flight than the input feature of the date of the flight, at an input layer of the neural network machine learning model, when the value of the date of the flight is not within a predetermined first number of days from a holiday;

assigning a greater weight to the input feature of the date of the flight than the input feature of the weather of the connecting city of the flight, at the input layer of the neural network machine learning model, when the value of the date of the flight is within the first number of days from a holiday; and training the machine learning model using historical transaction data indicative of overbooked, or non-overbooked flights, for a plurality of users, wherein the indication of overbooked, or non-overbooked flights is used at the output layer of the neural network machine learning model in a back propagation process, aiding in computing error of partial derivatives that is minimized across layers, and adjusting weights of the input layer of the model.

13. The device of claim 12, the operations further comprising:

wherein the user browsing data comprises one or more of: (a) button-clicks, (b) keyboard-stroke logs, (c) capture of user input in forms and webpage data fields via the event listener, (d) records of detection of loading of airlines' webpages through their URL by the user, (e) detection of names of common airlines accessed by the user on a webpage within the browser, (f) detection of a credit card transaction occurring in the user's browser regarding an airline purchase, and (g) detection of the user accessing a well-known plane travel website aggregator by the user within the browser.

14. The device of claim 12, the operations further comprising:

wherein the monitoring of user browsing data simultaneously while the user is making the booking, before the user has finished making the booking.

15. The device of claim 12, the operations of checking whether the parsed parameters indicate that a flight is being booked further comprises:

comparing the parsed parameters to at least one of: (a) a list of the user's past credit card transactions in a transaction data repository, (b) a list of commonly used flight aggregator sites and airlines in a flight data repository, and (c) a list of common user form-inputs associated with airline purchases in the transaction data repository.

16. The device of claim 12, the operations further comprising:

wherein the attempting to book the ticket occurs on the at least one central computing device.

17. The device of claim 12, the predicting operation further comprising:

wherein the neural network machine learning model has additional inputs for predicting the likelihood of the flight being overbooked including one or more of:

time of booking;

airline being booked;

name of the customer who the flight is being booked for;

number of passengers on the booking;

name of the customer who is purchasing the flight;

frequent flyer mileage or ID numbers;

weather forecasts for the date of the booking;

weather history for past years pertaining to the date of the booking;

historical weather data in the dates proximate to the date of the booking within a predetermined time window;

number of customers in a transaction data repository that may have purchased or booked the same flight;

profile type of the user as a frequent or infrequent purchaser of tickets;

profile type of the user as an economy spender or non-economy spender on tickets; and wherein a machine learning logic operates on the inputs, and indicates the risk of overbooking to the user in one of ten risk classes as an output, sorted by the decile of risk, wherein when the risk of overbooking is in the fourth class or higher, it is indicated to the user as likely to be oversold, and when the risk of overbooking is in the third class or lower, it is indicated to the user as not likely to be oversold.

* * * * *